METHOD OF MANUFACTURE OF INFORMATION STORAGE DEVICES

Filed July 8, 1965

INVENTOR
JOHN BERNARD JAMES
BY
Hane and Nydick
ATTORNEYS 3,435,519
Patented Apr. 1, 1969

3,435,519

METHOD OF MANUFACTURE OF INFORMATION STORAGE DEVICES

John Bernard James, London, England, assignor to International Computers and Tabulators Limited, Putney, England, a British company Filed July 8, 1965, Ser. No. 470,498
Claims priority, application Great Britain, Aug. 12, 1964, 32,911/64
Int. Cl. H01f 7/06
U.S. Cl. 29—604 5 Claims

ABSTRACT OF THE DISCLOSURE

The present application discloses a method of manufacturing an information storage device using an area of thin magnetic film supported on a substrate, in which control conductors are laid across the film area to couple thereto and in which the conductors are also each coupled with a magnetic switching core for driving purposes. In the method described, the individual conductors are formed from a continuous strip conductor on which is threaded a number of the switching cores. The strip conductor is wound about the substrate to form a number of loops, each loop having one length passing across the film area. During winding, the switch cores are fed along the length of strip line and are located in notches provided for the purpose in the substrate so that a conductor loop passing across the film area is also threaded through an associated core. After winding, the individual conductor loops are effectively electrically isolated from one another by a common strap applied outside the film area to connect the loops to a common conductive path. Other conductor configurations using variations on this method of manufacture are disclosed, as is an apparatus for carrying out the initial winding of the strip line in conjunction with the selective feeding of the switch cores.

This invention relates to a method of, and apparatus for, manufacturing information storage devices.

The use of magnetic thin films in information storage devices is well known. One form of construction for a storage device is shown and described in British patent specification No. 942,567. In the storage device described therein, a number of spaced pairs of substrate plates each carry a magnetic storage thin film. A flexible insulating sheet carrying a plurality of parallel digit conductor loops embrace each plate pair, the word conductors being perpendicular to the digit conductors. Each crossing of a word conductor and a digit conductor defines a digit storage location in the magnetic film. The driving current for each word loop may be provided by coupling the loop to a magnetic switch core by means of a piece of wire passed through the core and joined to the ends of the loop, as described in British patent specification No. 964,700. This form of construction is quite satisfactory as far as the operational performance of the store is concerned, but it is obviously desirable to simplify and reduce the cost of manufacturing the store if possible.

The object of the present invention is to provide an improved method of, and apparatus for, manufacturing magnetic thin film storage devices.

According to one aspect of the invention, apparatus for manufacturing an information storage device utilising an area of magnetic thin film on a substrate, includes means to support said substrate; means to support an electrical conductor having a group of magnetic switching cores threaded thereon; means to produce relative movement between said substrate support and said conductor support to wind the conductor round the substrate to form a continuous winding along said substrate; and means operable during formation of said winding to release said cores in turn for entry into locating notches positioned along said substrate.

According to another aspect of the invention, a method of manufacturing an information storage device utilising an area of magnetic thin film on a substrate, includes the steps of threading a plurality of magnetic cores on an electrical conductor; winding the conductor around the substrate to form a continuous winding with said cores positioned in a plurality of locating notches spaced apart along said substrate; and making an electrically conductive connection between the turns of said winding, outside the film area, to form a plurality of conductor loops each coupled to a respective core and to said film area.

Figure 1:
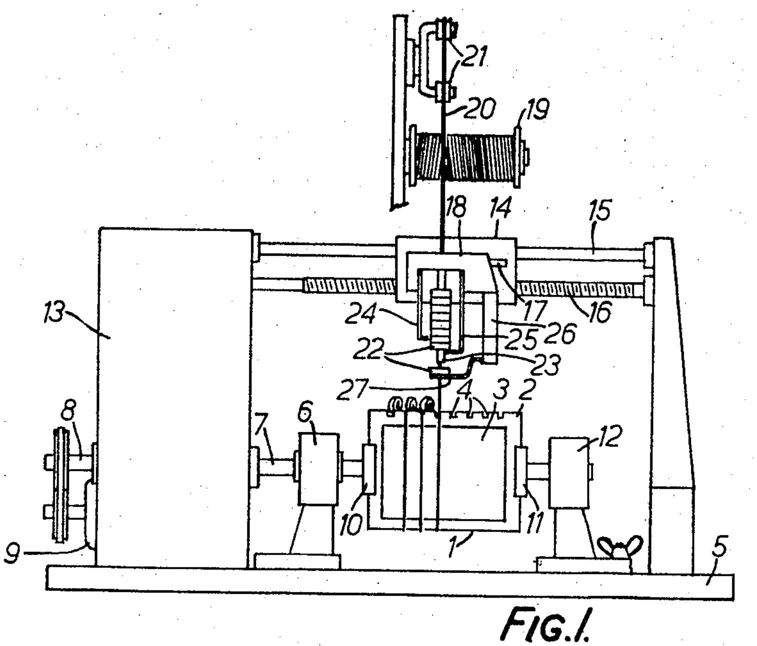
Figure 2:
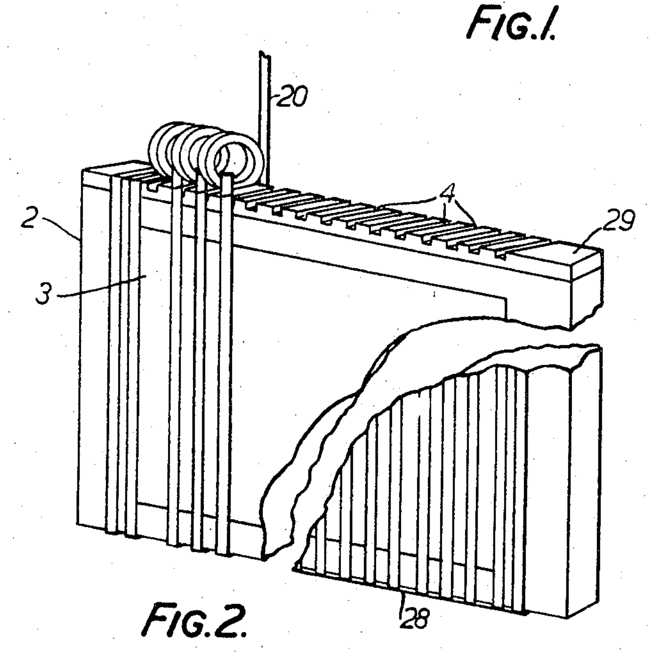

One embodiment of the invention will now be described, by way of example, with reference to the accompanying drawing in which:

FIGURE 1 shows, schematically, an apparatus for winding a conductor about a substrate, and FIGURE 2 shows details of a storage device.

Referring now to FIGURE 1 of the drawing, a single storage film plane 1 initially comprises a substrate 2 upon which an area of magnetic thin film 3 is deposited in the conventional manner. One edge of the substrate 2 carries a plurality of notches 4. The notches 4 are preferably arranged at an angle of about 45° to the faces of the substrate 2, as shown more clearly in FIGURE 2 of the drawing. In order to provide a plurality of word loops as previously described, the substrate 2 is supported in a conductor winding device, which may consist of a conventional coil winding apparatus modified for the purpose. Those parts of the coil winding apparatus which perform their conventional functions will be described only briefly, since the operation of such apparatus is well known. The apparatus consists of a main bed plate 5 which supports a headstock 6 carrying a driving shaft 7. The shaft 7 is driven by a main shaft 8 through a gear box 13 and the shaft 8 is belt-driven by an electric motor 9. The shaft 7 carries a chuck 10 for holding one edge of the substrate 2, and the opposite edge of the substrate 2 is held by a similar chuck 11 free to rotate in a tailstock 12, the position of which is adjustable relative to the headstock 6.

A carriage 14 is supported by a rod 15 to move in line with the bed plate 5 under control of a lead screw 16 driven by gearing within the gear box 13. This gearing is selected to obtain the desired rate of travel of the carriage 14 relative to the substrate 2 as the latter is rotated. The carriage 14 has a slot 17 parallel with the rod 15, and a block 18 is arranged to slide in the slot 17, the normal position of the block 18 being towards the left-hand end of the slot 17, as shown in FIGURE 1.

The usual conductor supply arrangements are provided on the apparatus. A spool 19 carries a continuous insulated strip conductor 20, which is passed over the usual tensioning rollers 21 and is threaded through a hole (not shown) in the block 18. In preparation for the operation of the apparatus, a number of switch cores 22 are threaded on the conductor 20, which is also passed through a tube 23. The threaded switch cores 22 are passed over the tube 23 and the tube 23 is then mounted in the block 18, as indicated in FIGURE 1. A core escapement mechanism having two flexible arms 24, 25 is mounted on the block 18, the arm 25 having a free end shaped to retain the cores on the tube 23 when this tube is mounted in the block 18.

The arms 24 and 25 of the escapement are operated by pins carried by a slider in the block 18, but, for the sake of clarity, this escapement operating arrangement is omitted from FIGURE 1. The arms 24 and 25 are movable laterally in unison to release a single core 22 from the tube 23 at each operation in the following manner. The arms 24 and 25 are initially in the left-hand position and the free end of the arm 25 engages the lowermost core 22 on the tube 23. If, now, the free ends of both arms 24 and 25 are moved to the right, the free end of the arm 24 moves against the next higher switch core 22 while the free end of the arm 25 disengages from the bottom core 22. Hence, the bottom core 22 is allowed to drop away while the remaining cores 22 are retained by the action of the arm 24. As the escapement is allowed to return to its initial position, the column of cores 22 drops until the lowermost core is again retained by the free end of the arm 25.

The block 18 also carries a post 26, at the lower end of which is supported a fork-shaped member 27, normally positioned with its prongs beneath the cores 22 and on either side of the conductor 20. A further step in preparing the apparatus for operation consists in releasing a single core 22 by operation of the escapement as described above. This core 22 then falls from the column and is retained by the member 27. The apparatus is now ready for operation.

The process of winding the conductor 20 about the substrate 2 will now be described. For the sake of clarity, the face of the substrate 2 carrying the magnetic film 3 will be referred to as the front, and the opposite face will be termed the back, of the substrate 2. The free end of the conductor 20 is secured to the back of the substrate 2 by, for example, adhesive tape, and a few turns of the conductor 20 are wound about the substrate 2 by rotation of the substrate 2. The substrate 2 is then positioned so that the notched edge is uppermost, as indicated in FIGURE 1, the substrate 2 being rotated slightly past the point at which it is aligned with the conductor 20 as it extends from the end of the tube 23. In this position the conductor 20 is engaged with the edge of one of the notches 4. The block 18 is then moved towards the right (FIGURE 1) causing the member 27 to move relative to the conductor 20. This movement causes that core 22 which is resting on the member 27 to lose contact with the member 27 and this core 22 then falls towards the notched edge of the substrate 2. Rotation of the substrate 2 is then resumed and the block 18 is moved back to its normal position on the carriage 14. The combination of these movements causes the core 22 to be engaged with the notch 4 in the substrate 2. During the second half of each revolution of the substrate 2, the escapement is operated to release a further core 22 to the member 27 in readiness for the next cycle of operation.

In a semimanual operation of the apparatus it has been found helpful to arrange that the rotation of the shaft 7 is controlled by a half-revolution electromagnetic clutch (not shown) controlled, for example, by a foot pedal. This enables the positioning of the core 22 to be visually checked and, if necessary, adjusted as the notched edge of the substrate 2 passes the lowermost part of its travel. In such a semimanual operation of the apparatus, it is convenient for the movement fo the block 18 relative to the carriage 14, and the operation of the escapement, to be manually controlled, but it will be realised that these operations may be made fully automatic by the provision of suitable cams and gearing in the gearbox 13, together with slide bars that are coupled to the block 18 and the escapement slide respectively.

Rotation of the substrate 2 and feeding of the cores 22 are continued until the required number of cores 22 are positioned in the notches of the substrate 2. It will be realised that the carriage 14 is advanced during rotation of the substrate 2 by the lead screw 16 so that for each complete rotation, the natural position of the conductor 20 is moved across the substrate 2 by a distance equal to the pitch of the notches 4. The formation of the notches 4 and the lateral movement of the conductor 20 caused by the engagement of a switch core 22 with a notch 4 is such that the position of the conductor 20 over each face is positively determined by the edges of the notches 4, as more clearly shown in FIGURE 2.

When all the required cores 22 have been engaged with their respective notches 4, the substrate 2 is preferably rotated for a few further turns and the conductor 20 is again secured to the back of the substrate 2 by adhesive tape. The conductor 20 is then severed between the securing tape and the spool 19, so that at this stage a single-layer winding has been formed about the substrate 2, passing through the previously threaded cores 22 which are now located in the notches 4 along one edge of the substrate 2.

The winding is now effectively formed into a plurality of separate loops, each coupled to a different core 22, respectively, by electrically connecting all the individual loops together outside the area of film 3. This is conveniently accomplished by removing the insulation from the conductor 20 where necessary and soldering all the loops to a conductive strip 28 laid along the lower edge of the substrate 2 as indicated in the lower right-hand corner of FIGURE 2. This has the effect of producing a substrate with individual word loops electrically and magnetically corresponding to the word drive conductors described in British patent specification No. 964,700 previously referred to, the strip 28 forming a common return path for all the loops. It will be realised that the forms of construction for the substrate referred to in that patent specification may also be used in the present case. For example, if the substrate 2 is electrically conductive, the strip 28 may be omitted and the loops may be connected by soldering directly to the substrate 2. Similarly, the substrates 2 may be arranged in back-to-back pairs, a single pair of substrates 2 being held together during the winding of the conductor 20 as described above. If the substrates 2 are not electrically conductive, a foil layer may be introduced between the substrates of each pair and this layer may be used for the common return connection to all the word loops as described in British patent specification No. 964,700. The word loops in the arrangement disclosed in that patent specification are separated from the substrate by the serpentine digit conductor formation referred to earlier, whereas in the present invention the word loops are immediately adjacent the substrate 2, the serpentine digit conductor formation being interlaced through an assembly of substrates 2 so that the digit conductors overlie the word loops. However, in a practical storage device it has been found that this difference is of no material significance.

The substrate 2 has been described as having the locating notches 4 in one edge. These notches 4 may be formed directly in the edge of the substrate 2 prior to the deposition thereon of the magnetic film 3 to form the film plane 1. However, the formation of the notches 4 in this manner, for example by a milling operation, before deposition of the film 3 may result in uneconomic production if the yield of acceptable film planes 1 from the deposition operation is low. The cost of performing such an expensive machining operation on substrates which may later be rejected may be avoided by producing separate notched strips, such as that indicated by the reference 29 in FIGURE 2. Notched strips 29 are then applied only to acceptable film planes 1 and are secured to the substrate 2 using, for example, a synthetic resin adhesive. The provision of separate strips, such as the strip 29, is also desirable where pairs of film planes 1 are to be used in back-to-back formation, a single strip 29 being provided for each pair of substrates 2. The provision of such a single strip 29 is to be preferred, in order to avoid the operation of accurately aligning the adjacent notches 4 which would be necessary if separate sets of notches 4 were provided for the substrates 2.

In all the preceding examples, it has been assumed that the conductor 20 is an insulated strip conductor, the insulation being removed at the point of soldering. In an alternative form of construction, however, an uninsulated conductor is used. In this case, the faces of the substrate 2 are themselves insulated, the insulation being provided, for example, by coating with an electrically insulating lacquer or by the formation of an insulating layer by vacuum deposition following the deposition of the film 3. Where the notches 4 are formed in a separate strip 29, the strip 29 may, for example, be of aluminium with anodised surfaces to provide the necessary insulation.

The commoning line for the loops has been described as constituted by, for example, a conductive strip 28 soldered to the portions of the winding passing over that edge of the substrate 2 opposite the notched edge. It will be realised, however, that the commoning line may be at other positions outside the area of the film 3. It may be, for example, on the back of the substrate 2 where the storage planes 1 are used singly. Moreover, the parts of the loops passing across the back of the substrate 2 may alternatively be effectively short-circuited by providing two interconnected commoning lines on the back of the substrate 2, one adjacent the notched edge and one adjacent the opposite edge.

The arrangement described in which a switch core 22 is provided for every turn of the winding leads to a form of construction in which a single word loop linked with a switch core 22 passes only once across the front of the substrate 2. This form of construction is required for the modes of operation described in the abovementioned British patent specification No. 964,700 in which a single elementary area of film is used for the storage of a single binary digit.

Other modes of operation have previously been proposed however, in which, for example, a pair of film areas are used for storing a single binary digit or in which a word loop is required to have "go" and "return" portions lying parallel across the film surface. It is possible to use the present method and apparatus in a modified manner to produce word conductor configurations usable for operation in such alternative modes. For example, in one case a switch core 22 is allowed to drop from the member 27 for every two complete revolutions of the substrate 2, so that cores 22 are located in alternate notches 4, the intermediate notches 4 serving only to locate the conductor 20 as it is wound about the substrate 2. The loops thus formed are then connected in common in a line at the back of the substrate 2 parallel and adjacent to the notched edge and other connections are made along the opposite edge to connect the loops in pairs. The back of the substrate 2 is covered with an adhesive tape, for example, to locate the ends of the "go" and "return" loops thus formed over the front of the substrate 2. Knife cuts through the tape and the conductor 20 are then made between the lines of connections on the back of the substrate 2, and the portions of the conductor 20 between these cuts is then removed by peeling off the tape between the cuts together with the adhering conductor portions. This form of construction results in the conductor loop linked with a core having two parallel sides lying across the film surface. It will be realised that other conductor configurations are also possible by suitable modifications to the method described, but that in all cases the word conductor loops are initially formed by a winding on the substrate 2 and that switch cores 22 are threaded on to the conductor 20 before winding is commenced. Moreover, it will also be realised that, while only a single conductor 20 has been described, various other configurations requiring, for example, interlaced or grouped conductor loops, may be formed by concurrently winding two or more conductors 20.

I claim:

1. A method of manufacturing an information storage device utilising an area of magnetic thin film on a substrate, including the steps of threading a plurality of magnetic cores on an electrical conductor; winding the conductor around the substrate to form a continuous winding with said cores positioned in a plurality of locating notches spaced apart along said substrate; and making an electrically-conductive connection between the turns of said winding, outside the film area, to form a plurality of conductor loops each coupled to a respective core and to said film area.

2. A method of manufacturing an information storage device utilising an area of magnetic thin film on a substrate, including the steps of threading a plurality of magnetic cores on an electrical conductor; winding the conductor around the substrate to form a continuous winding with said cores positioned in a plurality of locating notches spaced apart along said substrate; making a first electrically-conductive connection between the turns of said winding, outside the film area, to form a plurality of conductor loops each coupled to a respective core and to said film area; making a second electrically-conductive connection between said turns, outside the film area; and interconnecting said first and second electrically-conductive connections to short-circuit that part of each conductor loop not coupled to said film area.

3. A method of manufacturing an information storage device utilising an area of magnetic thin film on a substrate, including the steps of threading a plurality of magnetic cores on an electrical conductor; winding the conductor around the substrate to form a continuous winding with said cores positioned in a plurality of locating notches spaced apart along said substrate; making a first electrically-conductive connection between the turns of said winding, outside the film area; making a set of second electrically-conductive connections, outside said film area; to connect adjacent turns together in pairs; and removing that part of each turn which lies between said first and second connections and which is not coupled to said film area, to form pairs of loops each coupled to a core and each comprising two loops effectively wound in opposite senses across said film area.

4. A methd of manufacturing an information storage device, including the steps of forming a magnetic thin film on a substrate; providing a plurality of spaced-apart locating notches along one edge of the substrate; threading a plurality of magnetic switching cores on to an electrical conductor; rotating the substrate about an axis parallel to said one edge; guiding the conductor along said substrate, during rotation of said substrate, to form a continuous winding round said substrate with said cores located in said notches; and making an electrically-conductive connection between the turns of said winding, outside the film area, to form a plurality of conductor loops each coupled to a respective core and to said film area.

5. A method of manufacturing an information storage device including the steps of forming an area of thin magnetic film on one face of a flat substrate; providing a plurality of locating notches spaced apart along one edge of the substrate; threading a plurality of magnetic switch cores on a first electrical conductor; winding the threaded first electrical conductor about the substrate and concurrently selectively feeding the switch cores along said first conductor to locate individual ones of said switch cores each in a different one of said locating notches during the winding, said first electrical conductor forming a flattened multiturn spiral with adjacent turns of the spiral lying spaced apart across the film area; providing a second electrical conductor; and making an electrically conductive connection between a point, outside that area of the substrate occupied by the film, on each turn of said first electrical conductor and said second electrical conductor to form said first electrical conductor into a plurality of closed electrically conductive loops, each of which loops is coupled magnetically to one of said switch cores and to a part of the film.

References Cited

UNITED STATES PATENTS

| | | | |
|---|---|---|---|
| 3,106,703 | 10/1963 | Katzin | 340—174 |
| 3,352,001 | 11/1967 | Shaffer | 29—604 X |

JOHN F. CAMPBELL, *Primary Examiner.*

C. E. HALL, *Assistant Examiner.*

U.S. Cl. X.R.

29—605; 340—174